No. 679,812. Patented Aug. 6, 1901.
J. L. WOODBRIDGE.
METHOD OF REGULATING DOUBLE CURRENT DYNAMO ELECTRIC MACHINES.
(Application filed June 19, 1899.)
(No Model.)
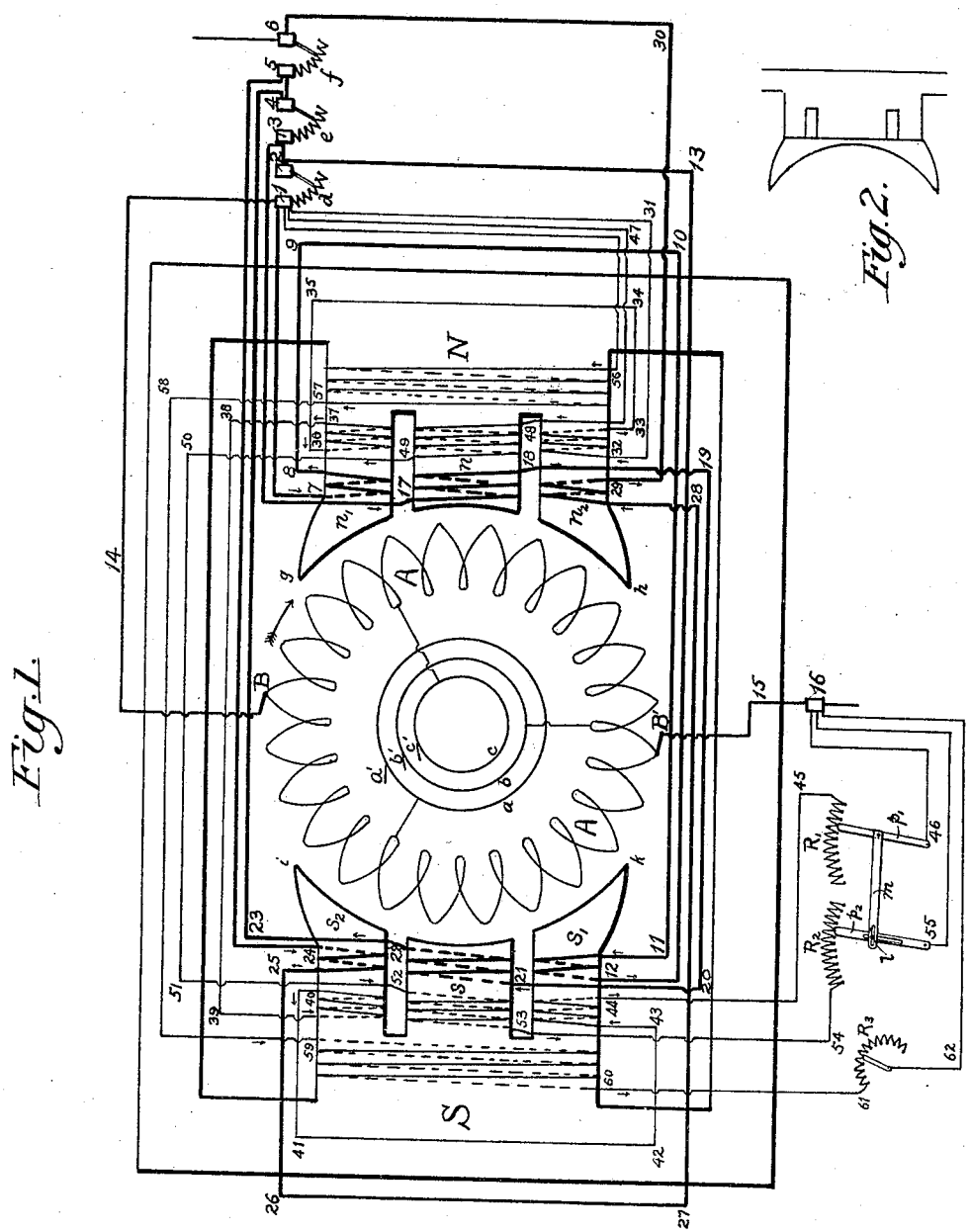
WITNESSES:
INVENTOR
J. Lester Woodbridge

UNITED STATES PATENT OFFICE.

JOSEPH LESTER WOODBRIDGE, OF CAMBRIDGE, MASSACHUSETTS.

METHOD OF REGULATING DOUBLE-CURRENT DYNAMO-ELECTRIC MACHINES.

SPECIFICATION forming part of Letters Patent No. 679,812, dated August 6, 1901.

Application filed June 19, 1899. Serial No. 721,100. (No model.)

*To all whom it may concern:*

Be it known that I, JOSEPH LESTER WOODBRIDGE, a citizen of the United States, residing in Cambridge, in the county of Middlesex, Commonwealth of Massachusetts, have invented certain new and useful Improvements in Methods of Regulating Double-Current Dynamo-Electric Machines, of which the following is a specification.

My invention relates to those dynamo-electric machines which are designed to develop or utilize both direct and alternating currents in one and the same armature-winding, and under the title "double-current dynamo-electric machine," which I have used throughout this specification and claims, I intend to include any dynamo-electric machine provided with both a commutator and collector-rings connected to the same armature-winding, whether the machine, first, is driven by some external source of power and delivers both alternating and direct currents, or, second, receives direct currents and delivers alternating currents, or, third, receives alternating currents and delivers direct currents. The first case is that of the double-current generator. The second and third cases are rotary converters. My invention is equally applicable to all three, and in using the phrase "double-current dynamo-electric machine" I intend to include them all. Also in referring to the electromotive force, whether alternating or direct, generated in the armature of such a machine, I intend to include not only such electromotive forces as are codirectional with the current, involving the function of generator, but also such as are counter to the current or to some applied electromotive force involving the function of motor.

It is the object of my invention to provide an improved method of controlling and varying the relation between the alternating and the direct current electromotive force developed in the armature of a double-current dynamo-electric machine. Up to the present time very little, if any, modification has been possible in the relation between these two electromotive forces. In the double-current generator they must rise or fall together with any variation of speed or field excitation. In a rotary converter receiving direct currents at constant voltage if any attempt is made to increase the alternating electromotive force by strengthening the fields the only effect will be to reduce the speed of rotation, the alternating voltage remaining the same. If the rotary is receiving alternating currents at constant electromotive force and delivering direct currents, the usual method of controlling the direct-current voltage, particularly where this is to be done automatically, consists in altering the field excitation; but such an alteration will still change both the direct-current voltage and the alternating counter electromotive force together, and for conditions of equilibrium will necessarily be accompanied by a change of phase relation between the applied and the counter alternating electromotive force unless the former is also changed. Ordinarily this change in phase relation is brought about more or less gradually by a temporary change in armature speed, the armature running ahead of or falling behind its former phase position, according as the excitation is diminished or increased, until it reaches its new position of equilibrium. Because of the inertia of the armature this method of regulation is sluggish in its action and introduces excessive fluctuations of current in the alternating supply-lines and produces a tendency in the armature to seesaw and be thrown wholly out of step, and equilibrium is not reëstablished until the phase position of the armature is altered sufficiently to introduce into the alternating supply-lines wattless currents of such magnitude in many cases as to cause exceedingly objectionable effects on the heating, efficiency, and regulation of the alternating-current apparatus and transmission-lines as well as on the steadiness of armature speeds. Now it is the object of my invention to provide an improved method of regulating the ratio between the alternating and the direct current voltage developed by a double-current dynamo-electric machine, which shall permit a comparatively wide variation of that ratio without introducing objectionable wattless currents into the alternating circuits or causing the other objectionable results above mentioned. While it is known that on account of the difficulties above cited no appreciable variation in the relation between the alternating and the direct current voltage developed by a double-current dynamo-electric machine as heretofore constructed can be effected practically, and that in the case of a rotary receiving alternating currents and delivering direct currents, when a considerable variation in the direct-current voltage is desired, it has been found necessary to alter the alternating voltage simultaneously either by some method of hand regulation or automatically by means of the inductive effects of the wattless currents above referred to in the alternating circuits, yet it is also known that in two differently-constructed double-current machines the ratio of the alternating to the direct current voltage may be markedly different on account of the difference in the relative breadth of the pole-faces and the resulting difference in the distribution of the lines of magnetic force and in the shape of the wave of alternating electromotive force. For example, two rotaries, each of the same number of phases and subjected to the same alternating electromotive force, may be constructed to give quite different direct-current electromotive forces without in either case introducing objectionable wattless currents into the alternating circuits by proportioning the pole-pieces differently in each case. Now it is the object of my invention to provide a method of varying and controlling the relation between the alternating and the direct current electromotive forces of a double-current dynamo-electric machine over a comparatively wide range by altering the relative distribution of the lines of magnetic force over the pole-face, and thus changing the shape of the wave of alternating electromotive force. Thus by concentrating the lines of force near the middle of the pole-face they will become more effective in producing alternating voltage, and the ratio of alternating to direct current electromotive force may be thus increased, the latter electromotive force being dependent not upon the distribution of the lines of force, but upon the total number of such lines. Conversely, if the lines of force are spread over a broad pole-face or concentrated near its tips they become less effective in producing alternating electromotive force (the lines of opposite polarity from two adjacent pole-faces counteracting each other when included within the same phase-section of the armature-winding) and the ratio of alternating to direct current electromotive force will be reduced.

In the accompanying drawings, Figure 1 shows a double-current dynamo-electric machine arranged for regulation by the method of my invention. Fig. 2 illustrates a modified construction of pole-piece.

In Fig. 1, A A represent the armature-winding of a three-phase double-current dynamo-electric machine, the armature being supposed to rotate in the direction shown by the arrow. B and B' are respectively the positive and negative direct-current brushes, shown for simplicity as bearing directly upon the armature-winding, but which will of course be understood to bear upon a commutator connected therewith in actual practice. These brushes are shown connected by circuits 14 and 15 to the terminals 1 and 16, respectively.

$a$, $b$, and $c$ are collector-rings, which are connected to the armature-winding at three equidistant points and upon which bear the brushes $a'$, $b'$, and $c'$, which constitute the alternating-current terminals of the machine.

N and S are the north and south poles, respectively, and are each divided into three separate horns or paths for the magnetic flux $n\ n'\ n^2$ and $s$, $s'$, and $s^2$. The divisions between these magnetic paths may extend entirely through to the pole-face, as shown in Fig. 1, or may be bridged over at the pole-face, as shown in Fig. 2. On the leading horns $n'$ and $s'$ are shown series windings 1 7 8 9 10 11 12 13 2. On the middle horns $n$ and $s$ are shown series windings 3 17 18 19 20 21 22 23 4. On the trailing horns $n^2$ and $s^2$ are shown series windings 5 24 25 26 27 28 29 30 6. By means of the connections shown between the terminals 2 and 3 and between 4 and 5 these three sets of windings are connected in series with each other and with the positive side of the direct-current circuit, terminal 6 constituting the positive terminal of the machine in relation to the external direct-current circuit. The effects of these three sets of windings on the respective pole-horns which they embrace may be modified and adjusted by means of the three adjustable shunts $d$, $e$, and $f$. I have also shown on the diagram the principal shunt-windings embracing the entire poles— viz., 1 56 57 58 59 60 61 62 16—in which circuit is included a hand regulating-rheostat $R^3$. Assuming that the machine is delivering direct currents at its direct-current terminals, the direction of these currents will be as shown by the arrows, and it will be noted that the effect of these currents in the series windings on the leading and trailing horns of the poles will be to increase the magnetic flux in them, while the current in the series windings on the middle horns will decrease the magnetism therein. It will be seen, therefore, that any increase in the direct-current output of the machine will strengthen the edges of the magnetic field and weaken it in the middle. The effect of this will be to increase the ratio of the direct-current electromotive force to the alternating electromotive force, and if the amount of current in the several windings be properly adjusted by means of the adjustable shunts $d$, $e$, and $f$ any one of several effects may be produced. If the edges of the field are considerably strengthened and the middle weakened to a less extent, the total magnetic flux, and therefore the direct-current voltage, will be increased, while the alternating voltage will remain stationary. This arrangement would be of advantage where the machine is driven by an outside source of power and is delivering both direct and alternating currents, as it permits the compounding or overcompounding at the direct-current terminals without interfering with the regulation at the alternating terminals. If the edges of the field are still further strengthened and the middle still further weakened, the same rise of direct-current electromotive force may be produced, accompanied by a fall of the alternating electromotive force. This is of special advantage where the machine is operating as a rotary converter and is driven by the alternating currents received at its collector-rings. The fall in alternating electromotive force in the armature may thus be made to correspond with any drop in the alternating lines due to the increased current in them. Still another effect may be secured in the latter case. The increased current in the alternating lines may cause a change in the phase of the applied alternating voltage, making it desirable to shift the phase of the counter electromotive force correspondingly. This may readily be done by adjusting one of the shunts $d$ or $f$, so as to strengthen the leading pole-horns to a greater extent than the trailing horns, or vice versa, according to the direction in which it is desired to shift the phase of the alternating counter electromotive force. Similarly by strengthening the excitation of one side of the field more than the other the distorting effects of armature reaction on the fields may be counteracted.

In addition to the above-described series windings, which will produce the results mentioned automatically with the variations of the direct current, I have shown on the diagram auxiliary shunt-windings on the several pole-horns. One of these circuits—viz., 1 31 32 33 34 35 36 37 38 39 40 41 42 43 44 45 46 16—consists of four windings, one on each of the four outer pole-horns, connected in series with each other and the whole four in shunt across the direct-current terminals of the machine. In this circuit is included a rheostat $R'$, by means of which the excitation of these pole-horns may be varied and controlled by hand. There are also shown similar shunt-windings 1 47 48 49 50 51 52 53 54 55 16 on the middle horns, the current in which may be controlled by a separate rheostat $R^2$. By this means the same variation and control of the ratio between the alternating and the direct current electromotive force may be effected by hand independently of the output or intake of the machine. Thus by throwing the arm $p'$ of rheostat $R'$ to the right the excitation of the outer horns will be increased, and by throwing the arm $p^2$ of rheostat $R^2$ to the right the excitation of the middle horns will be diminished. I have also shown a bar $n$ connecting mechanically the arms of the two rheostats, so that they may be both operated together, the motion of one controlling that of the other. If the excitation of the outer horns is considerably increased by a certain motion of the arm $p$ to the right and that of the middle horns only slightly decreased by a small motion of the arm $p^2$ to the right, the direct-current voltage may be raised without altering the alternating voltage. If with the same motion of the arm $p'$ the arm $p^2$ is moved considerably more than before, the direct-current voltage may remain constant while the alternating voltage is reduced, and opposite effects will of course be produced by moving the arms in the opposite direction. Now I have shown a longitudinal slot in arm $p^2$ and a similar one in the bar $n$ and a pin $l$ adjustable in said slots, by means of which said bar may be made to engage arm $p^2$ at various points in its length. Thus with any given motion of arm $p'$ arm $p^2$ may be made to move a greater or less distance by connecting the bar $n$ to it at a greater or less distance from its upper extremity. Thus the bar $n$ may be connected to the arm $p^2$ at such point that the alternating electromotive force may be raised or lowered without changing the direct-current electromotive force or at some other point such that the direct-current electromotive force may be raised or lowered without altering the alternating electromotive force.

In speaking of the "pole-face" it will be understood that I refer to the whole area between the pole-tips $g\,h$ or $i\,k$ and not simply to one of the portions into which this surface may be divided by the divisions referred to. It will also be understood that my invention applies to double-current machines having any number of poles and designed to utilize or develop alternating currents of any number of phases; nor do I confine myself to any particular means for or method of altering the distribution of the magnetic flux over the pole-face nor to any particular means for or method of doing this automatically. I have described an arrangement for varying this distribution automatically with variations of the direct-current output or intake; but a similar automatic regulation of this distribution could be made to accompany changes in the alternating-current intake or output by causing the currents in the series or the auxiliary shunt-windings to vary with said intake or output by any of the methods known to electrical engineers.

What I claim as my invention, and desire to secure by Letters Patent, is—

1. In the operation of a double-current dynamo-electric machine adapted to develop or utilize both alternating and direct currents in the same armature-winding, the method of varying and controlling the relation between the alternating and direct current electromotive force developed in the armature, which consists in varying the distribution of the lines of magnetic force over the pole-face, in a general direction parallel to the adjacent direction of armature motion.

2. In the operation of a double-current dynamo-electric machine, adapted to develop or utilize both alternating and direct currents in the same armature-winding, whose poles are each divided into several paths for the magnetic flux by divisions in a general direction at right angles to the adjacent direction of armature motion, the method of altering the distribution of the lines of magnetic force over the pole-face which consists in varying unequally or oppositely the excitation of the several paths.

3. In the operation of a double-current dynamo-electric machine, adapted to develop or utilize both alternating and direct currents in the same armature-winding, the method of controlling independently the alternating and the direct current electromotive force developed in its armature, which consists in increasing (or diminishing) the strength of the magnetic field near the tips of the pole-face and simultaneously diminishing (or increasing) the field strength in the middle of the pole-face by an amount greater or less in proportion to the change at the tips, according to which electromotive force is to be varied.

4. The method of controlling the relation between the alternating and the direct current electromotive force developed in the armature of a double-current dynamo-electric machine adapted to develop or utilize both alternating and direct currents in the same armature-winding, which consists in passing separately around each of three parallel paths of the magnetic circuit of each polarity, adjacent to the armature, electric currents which shall vary or may be varied in such manner as to produce unequal or opposite effects on the quantity of magnetic flux in the several paths of each polarity, substantially as described.

5. The method of varying the ratio between the alternating and the direct current electromotive force developed in the armature of a double-current dynamo-electric machine adapted to develop or utilize both alternating and direct currents in the same armature-winding, with changes in its output or intake, which consists in passing separately around each of three parallel paths of the magnetic circuit of each polarity, adjacent to the armature, direct currents equal or proportional to and varying with said output or intake, in such manner that variations in said currents shall cause unequal or opposite effects on the quantity of magnetic flux in the several paths of each polarity, substantially as described.

6. The method of varying the direct-current electromotive force developed in the armature of a double-current dynamo-electric machine adapted to develop or utilize both alternating and direct currents in the same armature-winding, with changes in the direct-current output or intake of the machine, without altering the alternating electromotive force developed in the armature, which consists in passing separately around each of three parallel paths of the magnetic circuit of each polarity adjacent to the armature, currents equal to or proportional to and varying with the direct-current output or intake, in such manner that variations in said currents shall increase (or diminish) the strength of the magnetic field near the pole-tips and simultaneously decrease (or increase) the field strength in the middle of the pole-face, substantially as described.

In testimony whereof I have affixed my signature in presence of two witnesses.

J. LESTER WOODBRIDGE.

Witnesses:
J. T. BRADBURY,
JOHN A. WHITE.